United States Patent [19]

Tabata et al.

[11] Patent Number: 5,707,317
[45] Date of Patent: Jan. 13, 1998

[54] CONTROL SYSTEM FOR AUTOMATIC TRANSMISSION

[75] Inventors: Atsushi Tabata, Okazaki; Masato Kaigawa, Toyota, both of Japan

[73] Assignee: Toyota Jidosha Kabushiki Kaisha, Toyota, Japan

[21] Appl. No.: 716,861

[22] Filed: Sep. 20, 1996

[30] Foreign Application Priority Data

Sep. 21, 1995 [JP] Japan .................. 7-267871

[51] Int. Cl.$^6$ .............. F16H 61/04; B60K 41/06
[52] U.S. Cl. .............................................. 477/109
[58] Field of Search ................................ 477/109

[56] References Cited

U.S. PATENT DOCUMENTS 5,417,625  5/1995  Yamaki et al. ...................... 477/109
5,580,331  12/1996  Shiraishi et al. .................... 477/109

FOREIGN PATENT DOCUMENTS

61-171846  8/1986  Japan .
7-83324  3/1995  Japan .

*Primary Examiner*—Dirk Wright
*Attorney, Agent, or Firm*—Oblon, Spivak, McClelland, Maier & Neustadt, P.C.

[57] ABSTRACT

A control system for an automatic transmission connected to an engine, in which a fundamental throttle opening is set with a predetermined delay characteristic from a depression stroke of an accelerator pedal and in which a present throttle opening is set with an inevitable delay and with a selective delay control for the fundamental throttle opening. A gear stage to be set in the automatic transmission is decided on the basis of the fundamental throttle opening, and an oil pressure to be fed to a frictional engagement unit for achieving a gear stage is set on the basis of the present throttle opening.

20 Claims, 9 Drawing Sheets

|  | $C_0$ | $C_1$ | $C_2$ | $B_0$ | $B_1$ | $B_2$ | $B_3$ | $B_4$ | $F_0$ | $F_1$ | $F_2$ |
|---|---|---|---|---|---|---|---|---|---|---|---|
| N | ○ | | | | | | | | | | |
| REV. | | | ○ | ○ | | | | ○ | | | |
| 1ST | ○ | ○ | | | | | | ● | ○ | | ○ |
| 2ND | ● | ○ | | | | | ○ | | ○ | | |
| 3RD | ○ | ○ | | | ● | ○ | | | ○ | ○ | |
| 4TH | ○ | ○ | ○ | | | △ | | | ○ | | |
| 5TH | | ○ | ○ | ○ | | △ | | | | | |

CONTROL SYSTEM FOR AUTOMATIC TRANSMISSION

BACKGROUND OF THE INVENTION

1. Field of the Invention

The present invention relates to a system for controlling a speed change in an automatic transmission of a vehicle and, more particularly, to a control system for an automatic transmission connected to an engine, in which a fundamental throttle opening is set with a predetermined delay characteristic from a depression stroke of an accelerator pedal and in which a present throttle opening is set with an inevitable delay and with a selective delay control for the fundamental throttle opening.

2. Related Art

As well known in the art, the vehicular automatic transmission performs the function to transmit the output of the engine to the wheels by accelerating/decelerating or reversing/ accelerating it. For this, it is necessary to set a gear stage according to the driving/running state such as the vehicle speed or the engine output. There is also needed a torque transmission capacity capable of transmitting the power, as inputted from the engine, reliably by accelerating/decelerating it. In the prior art, therefore, the vehicular automatic transmission is generally constructed to execute the speed change on the basis of the vehicle speed and the engine output (e.g., the throttle opening or an intake pipe vacuum). A frictional engagement unit to be applied for setting the gear stage is fed with an oil pressure according to the engine output so that the torque transmission capacity may be controlled to neither exceed nor be short of the torque inputted.

In recent years, on the other hand, the engine is controlled more and more electronically so that the throttle valve for controlling the output of the engine is not connected directly to the accelerator pedal through mechanical means such as a cable but is electrically controlled by driving a throttle actuator (e.g., a servo motor) on the basis of an output signal according to the depression of the accelerator pedal. This construction is exemplified in JP-A-61-171846, in which the change in the engine output is reduced if the change in the throttle opening (or the accelerator opening) is large.

If the accelerator opening (i.e., the depression stroke of the accelerator pedal), as based upon the manual operation, and the engine output fail to correspond completely in one-to-one relation, as described in the aforementioned Laid-Open, or if the depression stroke of the accelerator pedal is inputted and calculated so that the throttle valve is opened/closed on the basis of the calculation result, there exist a plurality of parameters indicating the output of the engine. As a result, the automatic transmission, as connected to the engine of this kind, may be subjected to a shift shock if the pressure for applying the frictional engagement unit to achieve a gear stage is set on the basis of the accelerator opening or a corresponding parameter.

In this engine, more specifically, the actual throttle opening is determined with an inevitable or control delay from the accelerator opening, and the change in the engine output is delayed with respect the operation of the accelerator pedal so that the engine output at a power-ON time is transiently lowered. As a result, the shift shock is enlarged if the application pressure of the frictional engagement unit is raised at that time.

If, on the contrary, the shift is decided on the basis of the actual opening of the throttle valve or a corresponding parameter, the actual throttle opening is controlled with a delay from the operation of the accelerator pedal so that the shift decision is delayed at the power-ON time, for example. Even if, moreover, the accelerator pedal is depressed to an extent necessary for a downshift from a 5th speed to a 2nd speed, the shift may be mistaken to occur from the 5th speed to a 3rd speed because the actual change in the throttle opening is small.

SUMMARY OF THE INVENTION

A main object of the present invention is to provide a system capable of executing the shift control of an automatic transmission connected to an engine, in which the throttle opening is controlled with a delay from the accelerator operation, with neither any deterioration in the shift shock nor any delay in or any misjudgment of the shift.

Another object of the present invention is to prevent the deterioration in the shift shock or the delay in the shift even if the control of delaying the throttle opening from the accelerator operation and the control of reducing the engine torque at a shifting time are executed in parallel.

In order to achieve these objects, according to an aspect of the present invention, there is provided a control system for an automatic transmission connected to an engine, in which a fundamental throttle opening is set with a predetermined delay characteristic from a depression stroke of an accelerator pedal and in which a present throttle opening is set with an inevitable delay and with a selective delay control for the fundamental throttle opening. This control system comprises: shift decision means for deciding a gear stage to be set in the automatic transmission, on the basis of the fundamental throttle opening; and oil pressure adjusting means for setting an oil pressure to be fed to a frictional engagement unit for achieving a gear stage, on the basis of the present throttle opening.

According to the control system of the present invention, more specifically, by depressing the accelerator pedal, the fundamental throttle opening is set at first according to the depression stroke. This fundamental throttle opening is set to suppress the change at the beginning of the depression of the accelerator pedal, for example, to prevent an abrupt change in the engine output so that the accelerator operation may be facilitated. With respect to this fundamental throttle opening, moreover, the present throttle opening is set with an inevitable delay or with a delay required from the engine control, and the throttle valve is controlled to achieve the present throttle opening.

Moreover, the shift is decided on the basis of the fundamental throttle opening so that its decision delay or misjudgment is prevented. On the other hand, the application pressure of the frictional engagement unit is so set on the basis of the present throttle opening as to take a level suited for the torque inputted to the automatic transmission, because of the highest correlation between the present throttle opening and the engine output, so that the shift shock is weakened.

The intentional control of delaying the present throttle opening from the fundamental accelerator opening is executed if a predetermined condition is satisfied. Only if this delay control is executed, the application pressure of the frictional engagement unit is set on the basis of the present throttle opening.

The condition to be adopted is that the drive range is set in the automatic transmission, that the temperature of the engine or the automatic transmission is over a predetermined level, and that the vehicle speed is over a predetermined value.

In the control system of the present invention, on the other hand, the application pressure of the frictional engagement unit is corrected, if the control of reducing the engine torque is executed at a shift time, on the basis of the reduction of the engine torque. More specifically, when the application pressure of the frictional engagement unit is set on the basis of the present throttle opening, the oil pressure, as based thereon, is corrected according to the control of reducing the engine torque. As a result, the application pressure of the frictional engagement unit becomes suitable for the engine torque to prevent any deterioration in the shift shock.

The above and further objects and novel features of the present invention will more fully appear from the following detailed description when the same is read with reference to the accompanying drawings. It is to be expressly understood, however, that the drawings are presented for purpose of illustration only and are not intended as a definition of the limits of the invention.

DETAILED DESCRIPTION OF THE PREFERRED EMBODIMENT

Figure 1:
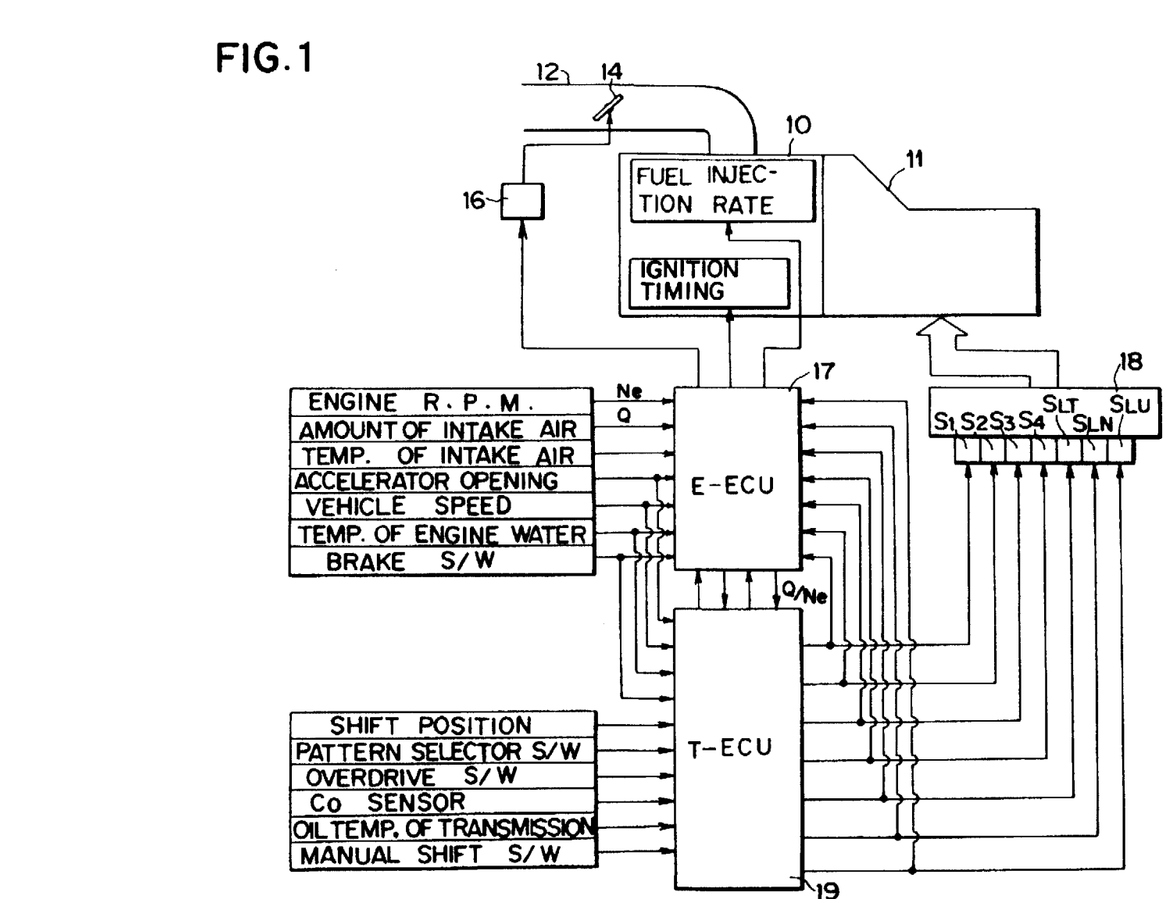
FIG. 1 is a block diagram schematically showing a control flow according to one embodiment of the present invention.

The present invention will be described more specifically with reference to the accompanying drawings. FIG. 1 is an overall control line diagram showing one embodiment of the present invention. An engine 10, as connected to an automatic transmission 11, is so constructed that its output is electrically controlled. An intake pipe 12 is equipped with an electronic throttle valve 14 which is driven by a servo motor (or throttle actuator) 16. There is provided an engine electronic control unit (E-ECU) 17 for controlling an ignition timing, a fuel injection rate and so on in the servo motor 16 and the engine 10. To this electronic control unit 17, moreover, there are inputted as its control data a variety of signals such as an engine (E/G) R.P.M. Ne, an intake air amount Q, an intake air temperature, an accelerator opening, a vehicle speed, an engine water temperature, or a signal coming from a brake switch.

Figure 2:
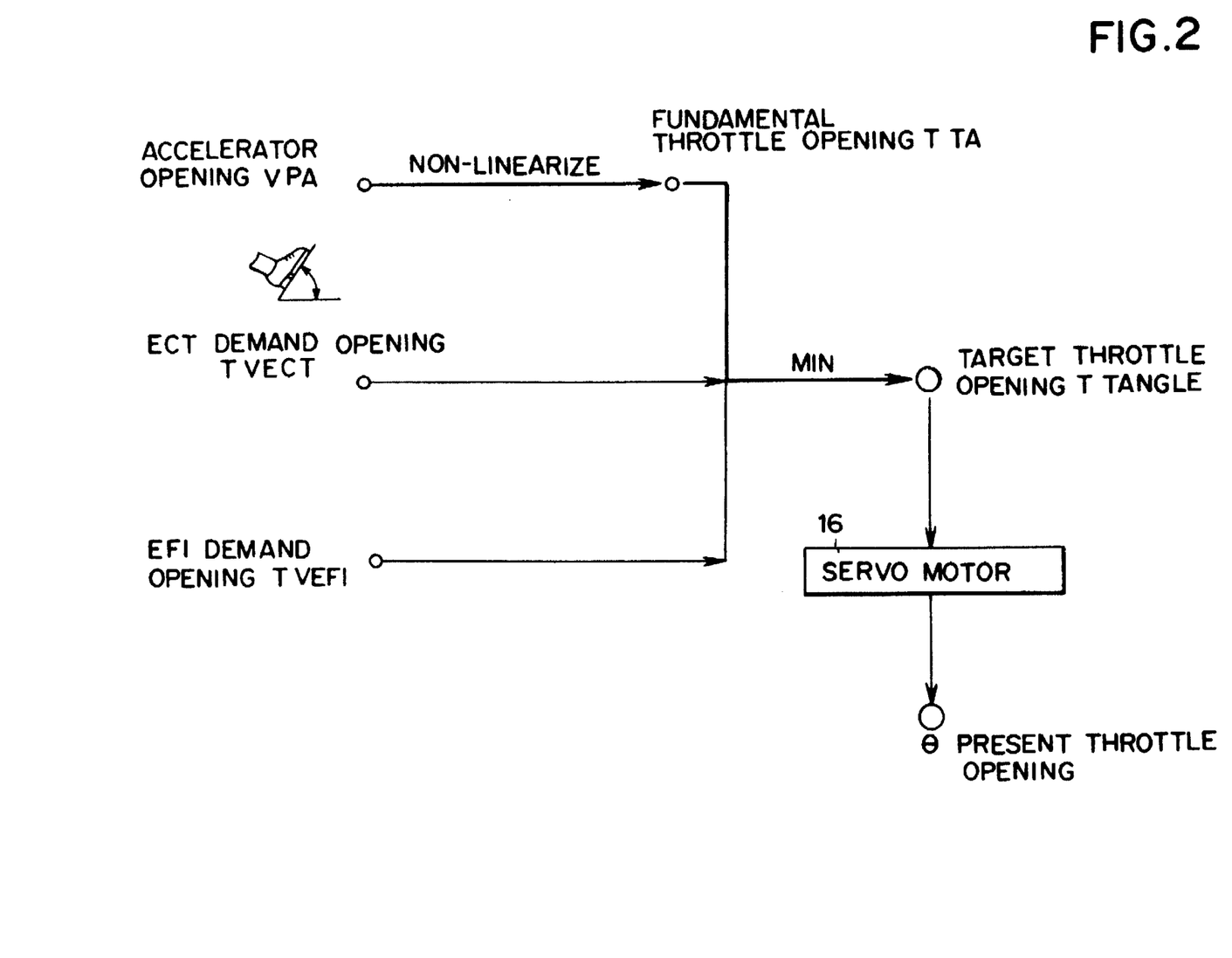
FIG. 2 is a diagram illustrating the relations of factors for determining an actual throttle opening.

Here will be described the control of the electronic throttle valve 14. This electronic throttle valve 14 is controlled, as the engine electronic control unit 17 drives the servo motor 16 in accordance with the depression of the (not-shown) accelerator pedal, and its actual opening (or present throttle opening) is increased/decreased according to not only the accelerator opening but also other factors. This relation is illustrated in the diagram of FIG. 2. As shown, a fundamental throttle opening TTA is determined to correspond to a depression stroke (or accelerator opening) VPA of the accelerator pedal. The relation of the fundamental throttle opening TTA to the accelerator opening VPA is so non-linearized that the increasing rate of the engine output may be lowered with respect to the depression stroke of the accelerator pedal at the beginning of the depression of the accelerator pedal thereby to facilitate the accelerator operation. This fundamental throttle opening TTA may be adopted as a target throttle opening TTANGLE, which is exemplified by the minimum of either a throttle opening TVECT, as demanded on the basis of the shift in the automatic transmission 11, or a throttle opening TVEFI, as demanded on the basis of the fuel injection control.

Moreover, the engine electronic control unit 17 drives the servo motor 16 so as to achieve its target throttle opening TTANGLE so that a present throttle opening θ is achieved In this case, there may be an electrically or mechanically inevitable delay in the control mechanism. Alternatively, a predetermined delay control is executed, if necessary.

In the automatic transmission 11, a hydraulic control unit 18 controls the shift, a lockup clutch, a line pressure and/or an engaging pressure of a predetermined frictional engagement means. The hydraulic control unit 18 is so constructed as to be electrically controlled and is equipped with: first to third shift solenoid valves S1 to S3 for executing the shift; a fourth solenoid valve S4 for controlling an engine braking state; a linear solenoid valve SLT for controlling the line pressure; a linear solenoid valve SLN for controlling an accumulator back pressure; and a linear solenoid valve SLU for controlling the engaging pressure of the lockup clutch or a predetermined frictional engagement means.

There is further provided an automatic transmission electronic control unit (T-ECU) 19 for controlling the shift, the line pressure and/or the accumulator back pressure by outputting signals to those solenoid valves. This electronic control unit 19 is composed mainly of a central processing unit (CPU), memory units (RAM and ROM) and an input/output interface and is fed as control data with the accelerator opening, the vehicle speed, the engine water temperature, the brake switch signal, a shift position signal, a pattern select switch signal, an overdrive switch signal, a signal coming from a CO sensor for detecting the R.P.M. of a later-described clutch C), an oil temperature of the automatic transmission and a signal of a manual shift switch.

Moreover, the automatic transmission electronic control unit 19 and the engine electronic control unit 17 are connected with each other for data communications. Specifically, signals such as a signal of an amount (Q/Ne) of intake air per revolution are sent from the engine electronic control unit 17 to the automatic transmission electronic control unit 19, whereas signals such as a signal equivalent to a command signal for each solenoid valve or a signal for commanding a gear stage are sent from the automatic transmission electronic control unit 19 to the engine electronic control unit 17.

More specifically, the automatic transmission electronic control unit 19 decides the gear stage, the ON/OFF of the lockup clutch, or the regulated pressure level of the line pressure or the engaging pressure on the basis of the data inputted and the map stored in advance and outputs a command signal to a predetermined solenoid valve on the basis of the answer of the decision to decide a failure or performs a control based on the decision. On the other hand, the engine electronic control unit 17 not only controls the fuel injection rate, the ignition timing and/or the opening of the electronic throttle valve 14 on the basis of the data inputted but also lowers the output torque temporarily by reducing the fuel injection rate at the shifting time of the automatic transmission 11, by changing the ignition timing and/or by throttling the opening of the electronic throttle valve 14.

Figure 3:
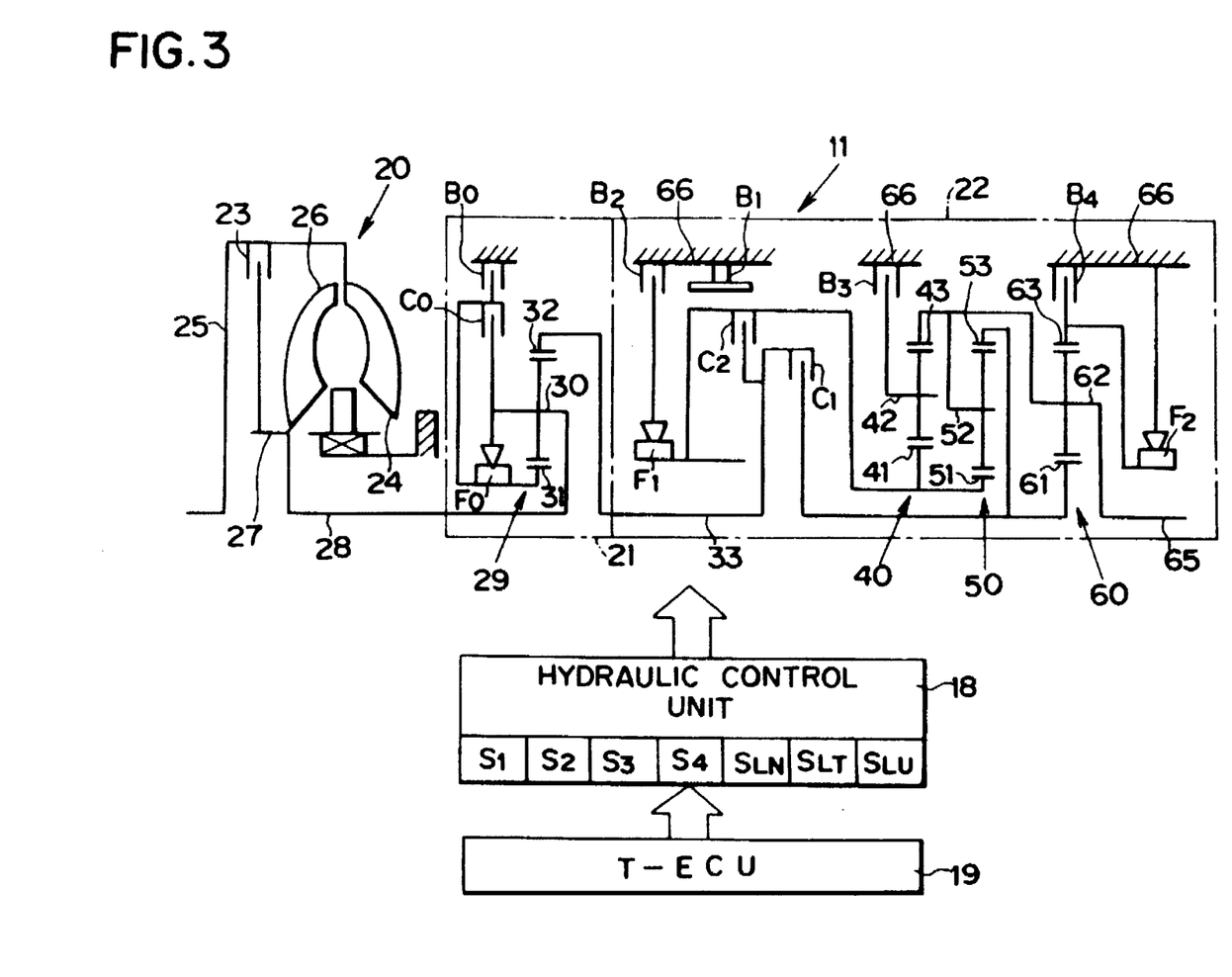
FIG. 3 is a diagram showing a gear train of an automatic transmission mainly.

FIG. 3 is a diagram showing one embodiment of the gear train of the automatic transmission 11 described above. As shown, the gear train is constructed to set five forward and one reverse gear stages. Specifically, the automatic transmission 11 is constructed of a torque converter 20, an auxiliary transmission unit 21 and a main transmission unit 22. The torque converter 20 is equipped with a lockup clutch 23 which is interposed between a front cover 25 integrated with a pump impeller 24 and a member (or hub) 27 integrated with a turbine runner 26. The engine has its crankshaft (although both are not shown) connected to the front cover 25, and an input shaft 28 having the turbine runner 26 connected thereto is connected to a carrier 30 of an overdrive planetary gear mechanism 29 constituting the auxiliary transmission unit 21.

Between the carrier 30 and a sun gear 31 of the planetary gear mechanism 29, there are interposed the multi-disc clutch C0 and a one-way clutch F0. Incidentally, this one-way clutch F0 is applied in case the sun gear 31 rotates forward (i.e., in the rotating direction of the input shaft 28) relative to the carrier 30. There is also provided a multi-disc brake B0 for braking the rotation of the sun gear 31 selectively. Moreover, a ring gear 32 acting as the output element of the auxiliary transmission unit 21 is connected to an intermediate shaft 33 acting as the input element of the main transmission unit 22.

In the auxiliary transmission unit 21, therefore, the planetary gear mechanism 29 rotates as a whole with the multi-disc clutch C0 or the one-way clutch F0 being applied, so that the intermediate shaft 33 rotates at the same speed as that of the input shaft 28, thus establishing a lower gear stage. With the brake B0 being applied to stop the rotation of the sun gear 31, moreover, the ring gear 32 is accelerated with respect to the input shaft 28 to rotate forward and a higher gear stage is established.

On the other hand, the main transmission unit 22 is equipped with three sets of planetary gear mechanisms 40, 50 and 60, which have their individual rotary elements connected, as follows. Specifically, a sun gear 41 of the first planetary gear mechanism 40 and a sun gear 51 of the second planetary gear mechanism 50 are integrally connected to each other. Moreover, a ring gear 43 of the first planetary gear mechanism 40, a carrier 52 of the second planetary gear mechanism 50 and a carrier 62 of the third planetary gear mechanism 60 are connected to one another, and an output shaft 65 is connected to the carrier 62 of the third planetary gear mechanism 60. In addition, the second planetary gear mechanism 50 has its ring gear 53 connected to a sun gear 61 of the third planetary gear mechanism 60.

The gear train of this main transmission unit 22 can set one reverse and four forward gear stages and is composed of the following clutches and brakes for those settings. Of these, the clutches will be described at first. A first clutch C1 is interposed between a ring gear 53 of the second planetary gear mechanism 50 and the sun gear 61 of the third planetary gear mechanism 60, which are connected to each other, and the intermediate shaft 33. Moreover, the second clutch C2 is interposed between the sun gear 41 of the first planetary gear mechanism 40 and the sun gear 51 of the second planetary gear mechanism 50, which are connected to each other, and the intermediate shaft 33.

Here will be described the brakes. A first brake B1 is a band brake which is arranged to stop the rotations of the sun gears 41 and 51 of the first and second planetary gear mechanisms 40 and 50. Between these sun gears 41 and 51 (i.e., the common sun gear shaft) and a casing 66, there are arrayed in series a first one-way clutch F1 and a second brake B2 which is a multi-disc brake. Of these, the first one-way clutch F1 is applied when the sun gears 41 and 51 are to rotate backward (of the opposite rotating directions of the input shaft 28). A third brake B3 which is a multi-disc brake is interposed between a carrier 42 of the first planetary gear mechanism 40 and the casing 66. Between a ring gear 63 of the third planetary gear mechanism 60 and the casing 66, there are arranged in parallel a fourth brake B4 which is a multi-disc brake for braking the rotation of the ring gear 63 and a second one-way clutch F2. Incidentally, this second one-way clutch F2 is applied when the ring gear 63 is to rotate backward.

Figure 4:
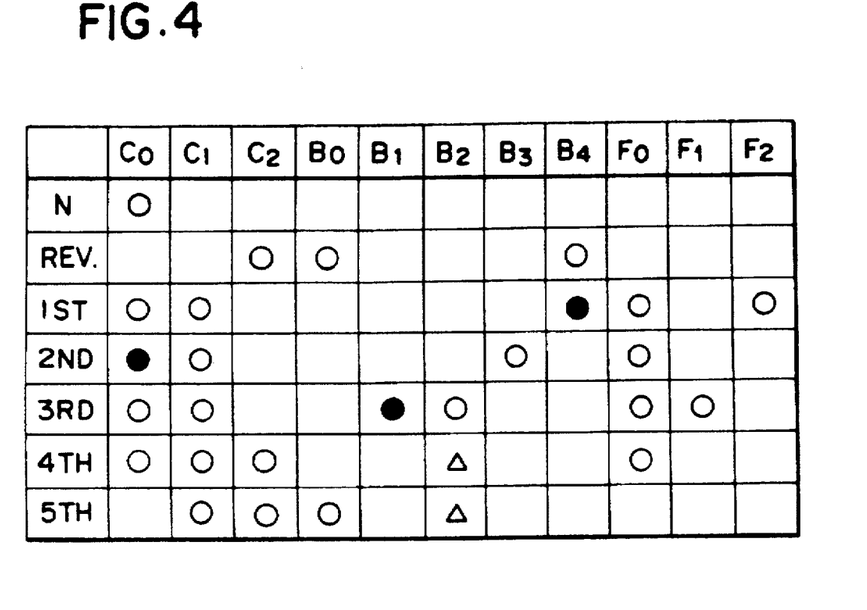
FIG. 4 is an operation chart for setting individual gear stages.

The automatic transmission 11 thus far described can set five forward and one reverse gear stages by applying/releasing the individual clutches and brakes, as tabulated in the clutch/brake application chart of FIG. 4. In FIG. 4: symbols ○ indicate the applied state; symbols ● indicate the applied state to be taken at the time of engine braking; symbols Δ indicate the applied or released state; and blanks indicate the released state.

Figure 5:
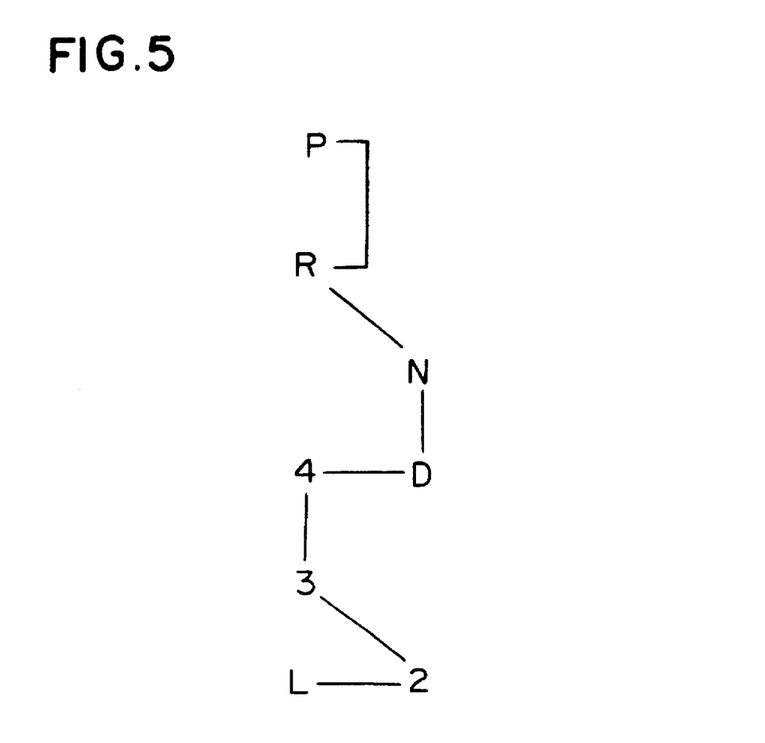
FIG. 5 is a diagram illustrating an array of the positions of individual ranges in a shift unit.

The individual gear stages, as enumerated in FIG. 4, are set to correspond to the running ranges which are selected by operating the (not-shown) shift lever. The positions of the running ranges, as selected by the shift lever, are arrayed, as shown in FIG. 5. Specifically, the position of the parking (P) range is followed by the position of the reverse (R) range, which is obliquely followed by the position of the neutral (N) range. The position of the drive (D) range is located to follow the N range and is arranged in parallel with the P range position and the R range position. The 4th speed range position is turned at a right angle from the array of the N- and D-range positions. The position of the 3rd speed range is located to follow the 4th speed range and is arranged in parallel with the array of the N- and D-range positions. The 2nd speed range position is located to take a relation similar to that of the N range position with respect to the R range position. The low (L) range position is located to take a relation similar to that of the 4th speed range position with respect to the D-range position.

Of these running ranges, the D range can establish the five forward gear stages, as shown in FIG. 4. On the other hand: the 4th speed range can establish the four forward gear stages except the 5th speed or overdrive gear stage; the 3rd speed range can establish the gear stages to the 3rd speed; the 2nd speed range can establish the gear stages to the 2nd speed; and the L range can establish only the 1st speed gear stage. As a result, when the shift lever is manually operated between the 3rd speed range position and the 2nd speed range position, there is established either an upshift from the 2nd to 3rd speeds or a downshift from the 3rd to 2nd speeds.

As tabulated in the clutch/brake application chart of FIG. 4, the shifts between the 2nd speed and the 3rd speed are effected by the clutch-to-clutch shifts in which both the application and release of the second brake B2 and the third brake B3 are changed together. In order to smoothen these shifts, a hydraulic circuit shown in FIG. 6 is incorporated into the aforementioned hydraulic control unit 18.

Figure 6:
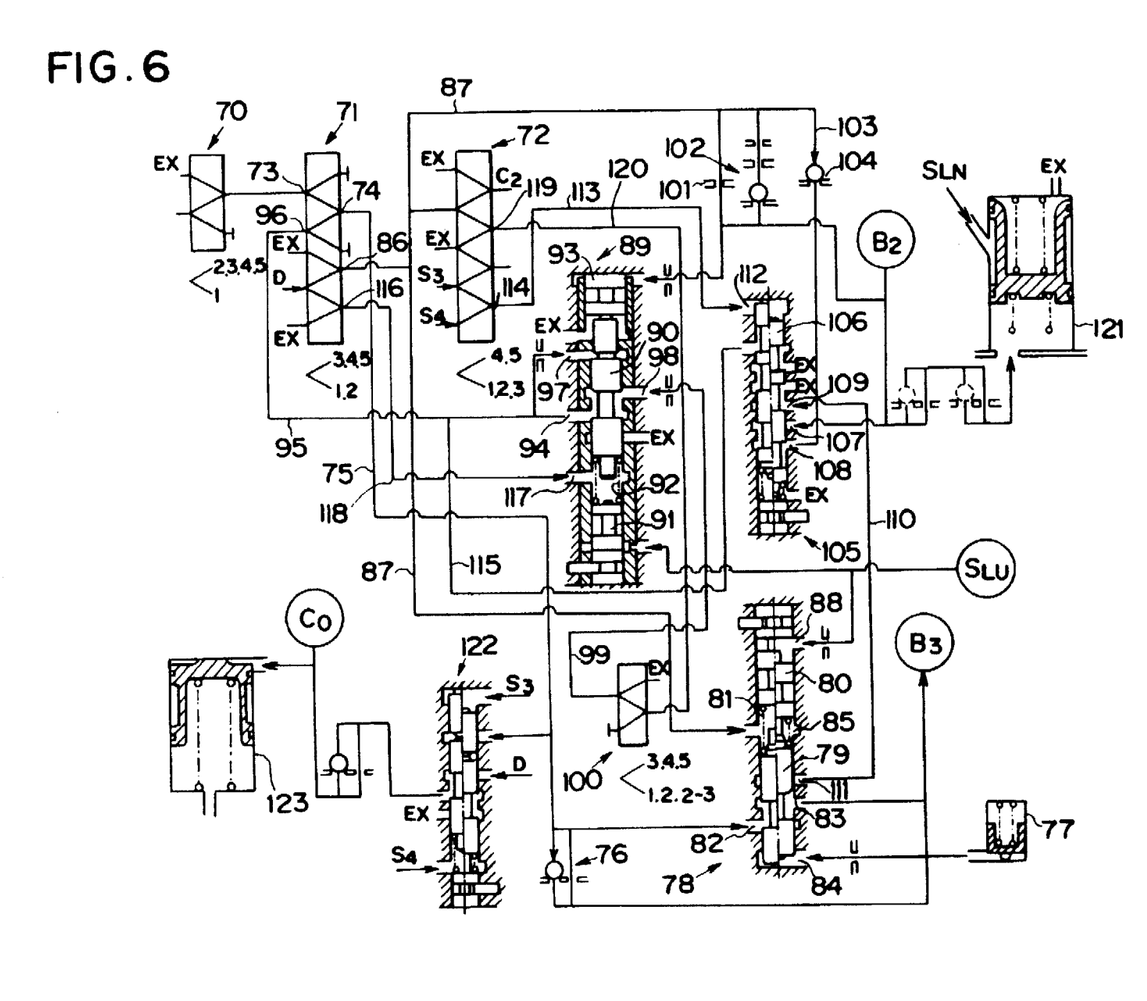
FIG. 6 is a diagram showing a portion of a hydraulic circuit.

In FIG. 6: reference numeral 70 designates a 1–2 shift valve; numeral 71 designates a 2–3 shift valve; and numeral 72 designates a 3–4 shift valve. These shift valves 70, 71 and 72 have their individual ports opened to have communications at the individual gear stages, as respectively enumerated below themselves. Incidentally, the numerals indicate the individual gear stages. Of the ports of the 2–3 shift valve 71, a brake port 74 to communicate with an input port 73 at the 1st and 2nd speeds is connected to the third brake B3 via an oil passage 75. This oil passage 75 is equipped with an orifice 76, and a damper valve 77 is connected between the orifice 76 and the third brake B3. The damper valve 77 sucks the oil pressure a little to perform its damping action in case the third brake B3 is abruptly fed with the line pressure.

Reference numeral 78 designates a B-3 control valve for controlling the engaging pressure of the third brake B3 directly. Specifically, the B-3 control valve 78 is equipped with a spool 79, a plunger 80 and a spring 81 sandwiched between the former two. An input port 82 to be connected by the spool 79 is connected to the oil passage 75, and an output port 83 to be selectively caused to communicate with the input port 82 is connected to the third brake B3. The output port 83 is further connected to a feedback port 84 which is formed at the inside of the leading end of the spool 79. On the other hand, a port 85 opened into a portion, in which the aforementioned spring 81 is arranged, is made to communicate with such one 86 of the ports of the 2–3 shift valve 71 via an oil passage 87 as outputs a D-range pressure at a 3rd or higher speed gear stage. Moreover, a control port 88 formed at the side of the end portion of the plunger 80 is connected to the lockup clutch linear solenoid valve SLU.

As a result, the B-3 control valve 78 has its regulated pressure level set by the elastic force of the spring 81 and the oil pressure fed to the port 85. In this case, the higher the signal pressure is fed to the control port 88, the larger the elastic force of the spring 81 becomes.

In addition, reference numeral 89 appearing in FIG. 6 designates a 2–3 timing valve which is constructed to include: a spool 90 formed with one radially smaller land and two radially larger lands; a first plunger 91; a spring 92 sandwiched between the former two; and a second plunger 93 arranged at the side opposed to the first plunger 91 across the spool 90. This 2–3 timing valve 89 has its intermediate port 94 connected to an oil passage 95, which in turn is connected to such a port 96 of the 2–3 shift valve 71 as is caused to communicate with such the brake port 74 at a 3rd or higher speed gear stage.

Moreover, the oil passage 95 is branched in its midway and connected through an orifice to a port 97 which is opened between the aforementioned smaller-diameter land and one of the larger-diameter lands. A port 98 to be selectively caused to communicate with the port 94 at the intermediate portion is connected via an oil passage 99 to a solenoid relay valve 100. Moreover, the lockup clutch linear solenoid valve SLU is connected to the port which is opened in the end portion of the first plunger 91, and the second brake B2 is connected through an orifice to the port which is opened in the end portion of the second plunger 93.

The aforementioned oil passage 87 is provided for applying/releasing the oil pressure to and from the second brake B2 and is equipped in its midway with a smaller-diameter orifice 101 and an orifice 102 having a check ball. From this oil passage 87, there is branched an oil passage 103 which is equipped with a larger-diameter orifice 104 having a check ball to be opened when the second brake B2 is to be released. The oil passage 103 is connected to an orifice control valve 105, as will be described in the following.

This orifice control valve 105 controls the rate of releasing the pressure from the second brake B2. This second brake B2 is connected to a port 107 which is so formed in an intermediate portion as can be opened or closed by a spool 106 of the orifice control valve 105 The aforementioned oil passage 103 is connected to a port 108 which is formed below that port 107, as shown. A port 109 is formed above the port 107 connected to the second brake B2, as shown, and is selectively caused to communicate with a drain port. To that port 109, there is connected via an oil passage 110 a port 111 of the aforementioned B-3 control valve 78. Incidentally, this port 111 is selectively caused to communicate to the output port 83 which is connected to the third brake B3.

Of the ports of the orifice control valve 105, a control port 112 formed at the end portion opposed to the spring for urging the spool 106 is connected to a port 114 of the 3–4 shift valve 72 via an oil passage 113. This port 114 outputs a signal pressure of the third solenoid valve S3 at a 3rd or lower speed gear stage and a signal pressure of the fourth solenoid valve S4 at a 4th or higher speed gear ratio. To the orifice control valve 105, moreover, there is connected an oil passage 115 which is branched from the aforementioned oil passage 95 and which is selectively caused to communicate with the drain port.

Incidentally, in the aforementioned 2–3 shift valve 71, a port 116 for outputting a D-range pressure at a 2nd or lower speed gear state is connected via an oil passage 118 to a port 117 which is opened in such a portion of the aforementioned 2–3 timing valve 89 as is arranged with the spring 92. In the 3–4 shift valve 72, moreover, a port 119, which is caused to communicate with the aforementioned oil passage 87 at a 3rd or lower speed gear stage, is connected via an oil passage 120 to the solenoid relay valve 100.

In FIG. 6, reference numeral 121 designates an accumulator for the second brake B2. A back pressure chamber of the accumulator 121 is supplied with an accumulator control pressure which is regulated on the basis of the oil pressure outputted by the linear solenoid valve SLN. Incidentally, the accumulator control pressure becomes higher as the output pressure of the linear solenoid valve SLN is lowered. Accordingly, in a transition region between application and release of the second brake B2, the oil pressure thereof is shifted to a higher level as the signal pressure of the linear solenoid valve SLN is lowered.

Moreover, reference numeral 122 designates a C-0 exhaust valve, and numeral 123 designates an accumulator for the clutch C0. Incidentally, the C-0 exhaust valve 122 applies the clutch C0 so as to effect the engine braking only at the 2nd speed in the 2nd speed range.

According to the hydraulic circuit thus far described, therefore, if the port 111 of the B-3 control valve 78 is in communication with the drain, the engaging pressure to be fed to the 3rd brake B3 can be directly regulated by the B-3 control valve 78, and its regulated pressure level can be varied by the linear solenoid valve SLU. If, on the other hand, the spool 106 of the orifice control valve 105 is in the position, as shown at the lefthand half of FIG. 6, the second brake B2 has communication with the oil passage 103 through that orifice control valve 105. As a result, the pressure can be released through the larger-diameter orifice 104 to control the rate of releasing the pressure from the second brake B2.

The speed changes in the aforementioned automatic transmission 11 are decided on the basis of the vehicle speed or the drive state of the engine 10. The output of this engine 10 is substantially controlled through the aforementioned servo motor 16 by the electronic control unit 17 so that the shift decision and the control of the engine output at the shifting time are executed, as follows.

Figure 7:
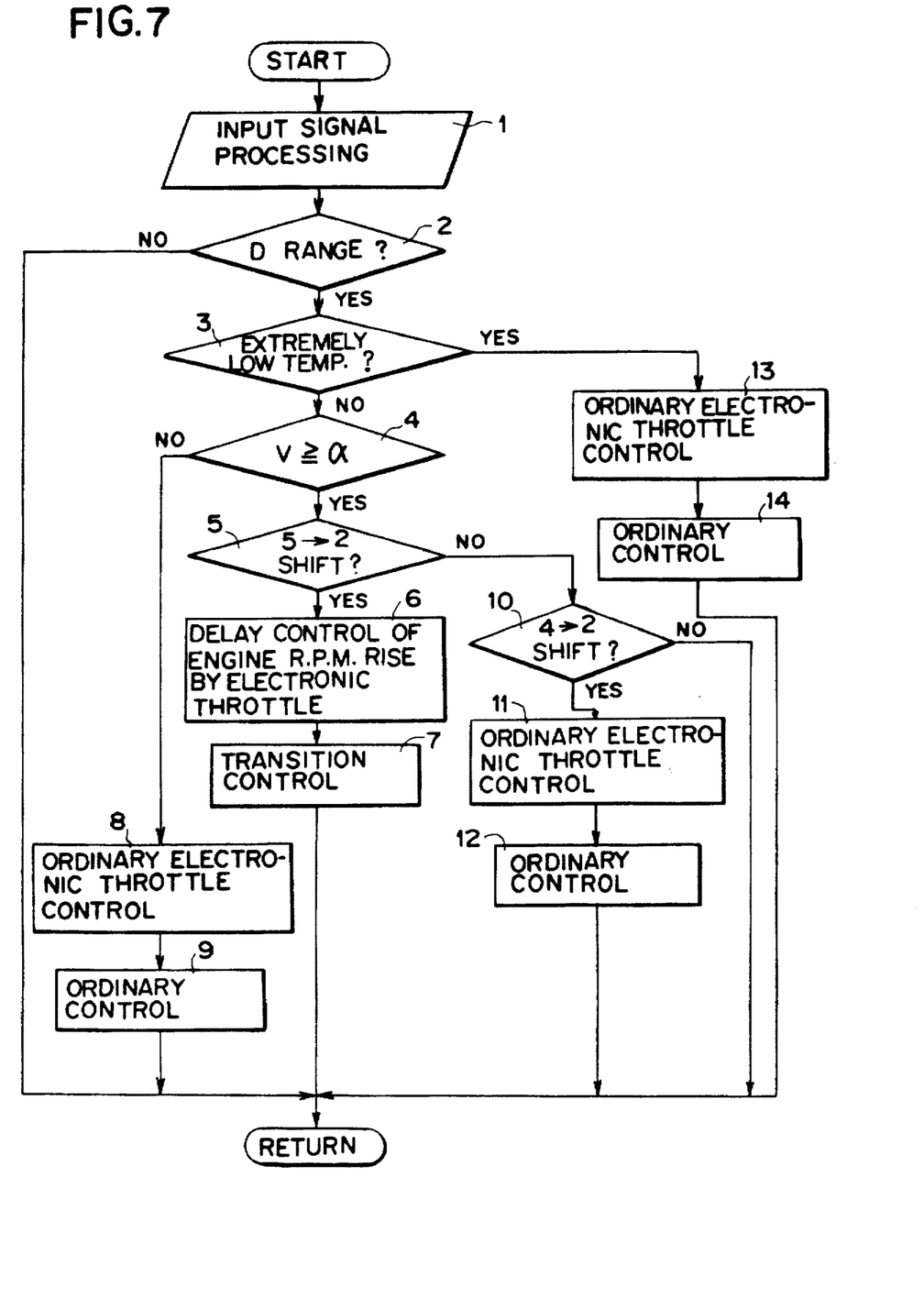
FIG. 7 is a flow chart showing one example of a control routine for selecting the delay control and an ordinary control of an electronic throttle valve in accordance with the situation of the vehicle.

In FIG. 7, input signals are processed (at Step 1 ), and it is then decided (at Step 2) whether the drive range (or D range) is selected. This decision is made on the basis of the signal outputted from the (not-shown) shift device if the shift lever is operated to the D-range position, as shown in FIG. 5. If the answer of Step 2 is NO because the D range is not selected, this routine is skipped out without any control because the abrupt increase in the drive force due to a downshift need not be suppressed.

If the D range is selected, on the other hand, it is decided (at Step 3) whether or not the engine is at an extremely low temperature. This is partly because the combustion in the engine 10 may become unstable if the engine cooling water is at a low temperature and partly because the high viscosity of oil may make the control of oil pressure unstable if the automatic transmission 11 is at a low temperature. If the vehicle is in an ordinary running state after sufficiently warmed up, the answer of Step 3 is NO, and it is then decided (at Step 4) whether or not the vehicle speed V is no less than a predetermined reference value α. This reference vehicle speed α is set to such a value as need not change the vehicle speed responsibility in accordance with the speed change width of the downshift. Incidentally, these Steps 2 to 4 correspond to the "control condition decision means" of the present invention.

Figure 8:
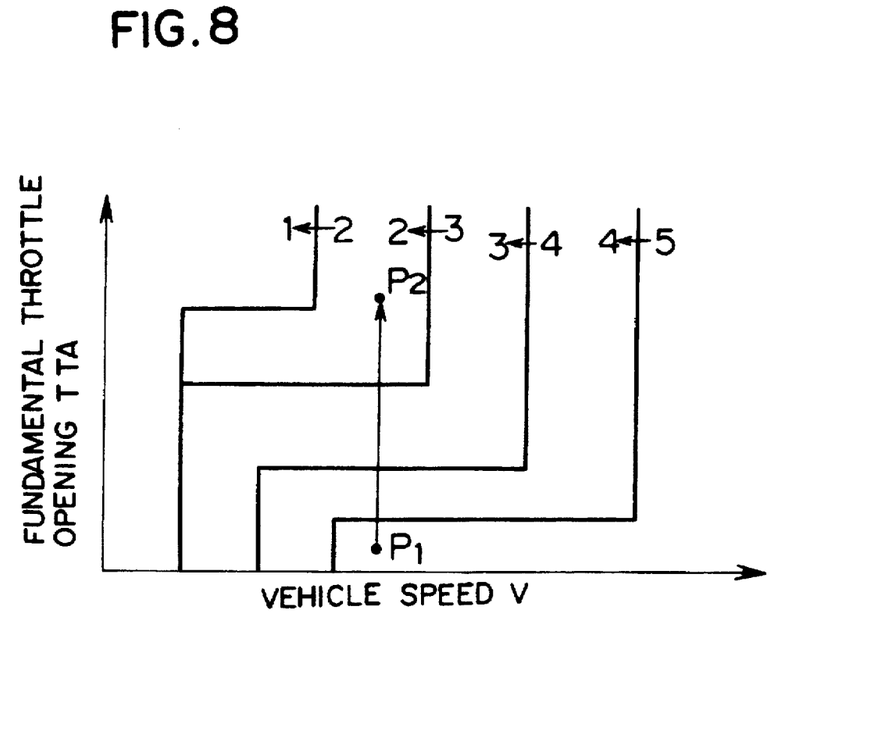
FIG. 8 is a schematic diagram presenting one example of a shift map with only downshift lines.

If the answer of Step 4 is YES because the vehicle is running at a relatively high speed, it is decided (at Step 5) whether or not a downshift is made from the 5th speed to the 2nd speed This decision is made on the basis of a shift diagram, as shown in FIG. 8. In this shift diagram, the gear stage regions from the 1 st to 5th speeds are set by taking the vehicle speed V on the abscissa and the fundamental throttle opening TTA on the ordinate. FIG. 8 presents only the downshift lines. When the driving/running state of the vehicle is located at point P1 of FIG. 8, it is changed to the state, as indicated by point P2, by depressing the accelerator pedal fully. Then, the driving/running state passes the downshift line and enters the 2nd speed region, the downshift from the 5th to 2nd speeds is decided.

If this 5th-to-2nd speed downshift is decided, the control of delaying the rise in the engine R.P.M. by the electronic throttle valve 14 is executed (at Step 6). This is a control for delaying the setting of the present throttle opening θ, as based upon the aforementioned target throttle opening TTANGLE, to prevent the vehicle from being rushed out by the abruptly increased engine output. Moreover, this control is executed by suppressing the output to the servo motor 16 by the electronic control unit 17 thereby to retard the change in the actual opening of the throttle valve 14 in spite of the fact that the fundamental throttle opening TTA is increased by depressing the accelerator pedal. Incidentally, the operation of Step 6 corresponds to the "delay control means" of the present invention.

Figure 9:
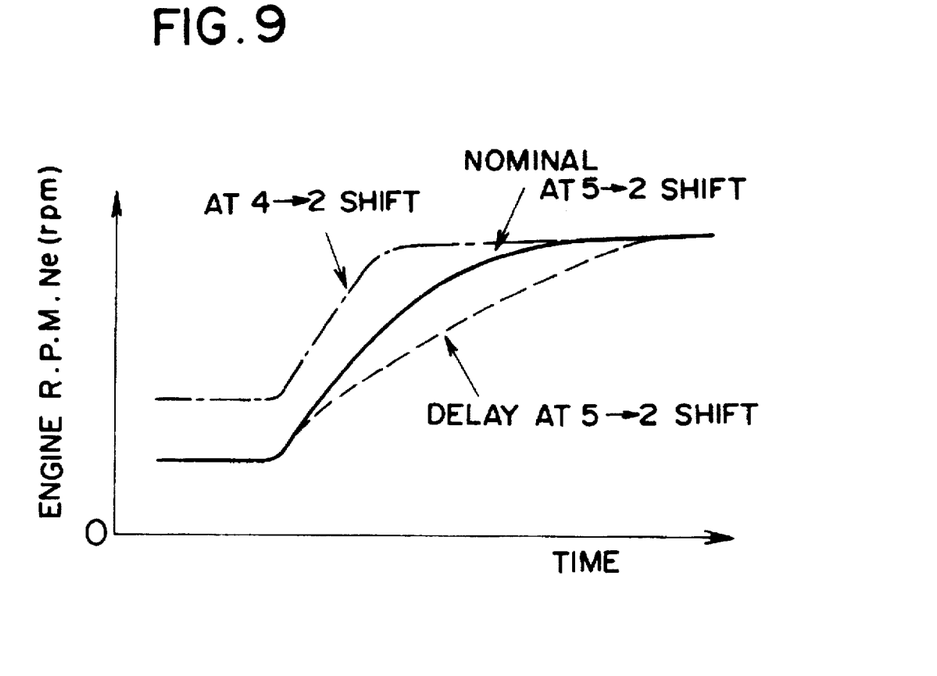
FIG. 9 is a schematic diagram illustrating the changes in an engine R.P.M. depending upon whether or not the delay control of the electronic throttle valve is executed.

The change in the engine R.P.M. Ne, as caused by this control, is illustrated in FIG. 9, as compared with the case of no delay control. Specifically, the ordinary change in the engine R.P.M. Ne at the downshift from the 5th speed to the 2nd speed is indicated by a solid curve in FIG. 9. With the aforementioned delay control, on the other hand, the engine R.P.M. Ne changes, as indicated by a broken curve in FIG. 9, to suppress the increase in the engine output.

If the delay control of the present throttle opening θ is executed, a transition control it executed (at Step 7). This contains the controls of changing such various parameters and by timings accompanying the suppression of the increase in the engine output as are exemplified making the backup timer for deciding the shift end longer than the ordinary one, by changing the various timings starting from the shift decision, or by changing the reference for setting the engaging oil pressure from the fundamental throttle opening TTA to the present throttle opening θ.

If the answer of Step 4 is NO because the vehicle is running at a low speed, what is executed (at Step 8) is not the delay control, in which the present throttle opening θ is changed to the target throttle opening TTANGLE, but the ordinary electronic throttle control accompanied by only the inevitable delay. As a result, the engine R.P.M. Ne changes, as indicated by the solid curve in FIG. 9. In addition, the ordinary oil pressure control and timing control are executed (at Step 9) in the automatic transmission 11.

If the answer of Step 5 is NO because the shift from the 5th speed to the 2nd speed is not executed, it is then decided (at Step 10) whether or not the shift from the 4th speed to the 2nd speed is executed. If this answer is NO, this routine is skipped out without any control. If the answer is YES, on the other hand, the ordinary electronic throttle control (at Step 11) and the ordinary control (at Step 12) at the automatic transmission 11 are executed. Specifically, the delay control of the present throttle opening θ to the target throttle opening TTANGLE is not executed so that neither the oil pressure nor the timing in the automatic transmission 11 is changed. Since, in this case, the change range of the driving force of the engine 10 is smaller than that of the downshift from the 5th speed to the 2nd speed, the delay in the response to the engine output change can be reduced so that the engine R.P.M. Ne changes, as indicated by a single-dotted curve in FIG. 9.

If, moreover, the answer of Step 3 is YES because the engine temperature or the oil temperature is low, an unstable state may arise in the combustion in the engine 10 or the control in the automatic transmission 11. Hence, the ordinary electronic throttle control (at Step 13) and the ordinary control (at Step 14) in the automatic transmission 11 are executed. In this case, for the shift control in the automatic transmission 11, the various control constants may be made different from those for the high oil temperature, because the oil has a low temperature so that its viscosity is high.

As described above, the decision of a shift in the automatic transmission 11 is made on the basis of the fundamental throttle opening TTA. If the fluctuation range of the driving force is enlarged by the shift, the so-called "delay control" for the present throttle opening θ is executed. In the case of this shift, therefore, the torque to be inputted to the automatic transmission 11 is changed with a delay from the ordinary case so that the increase in the engine output is suppressed for the power-ON downshift. Thus, the engaging pressure of the frictional engagement unit in the automatic transmission 11 needs to be controlled according to the input torque. For this necessity, the control system thus far described is constructed to execute the following controls.

Figure 10:
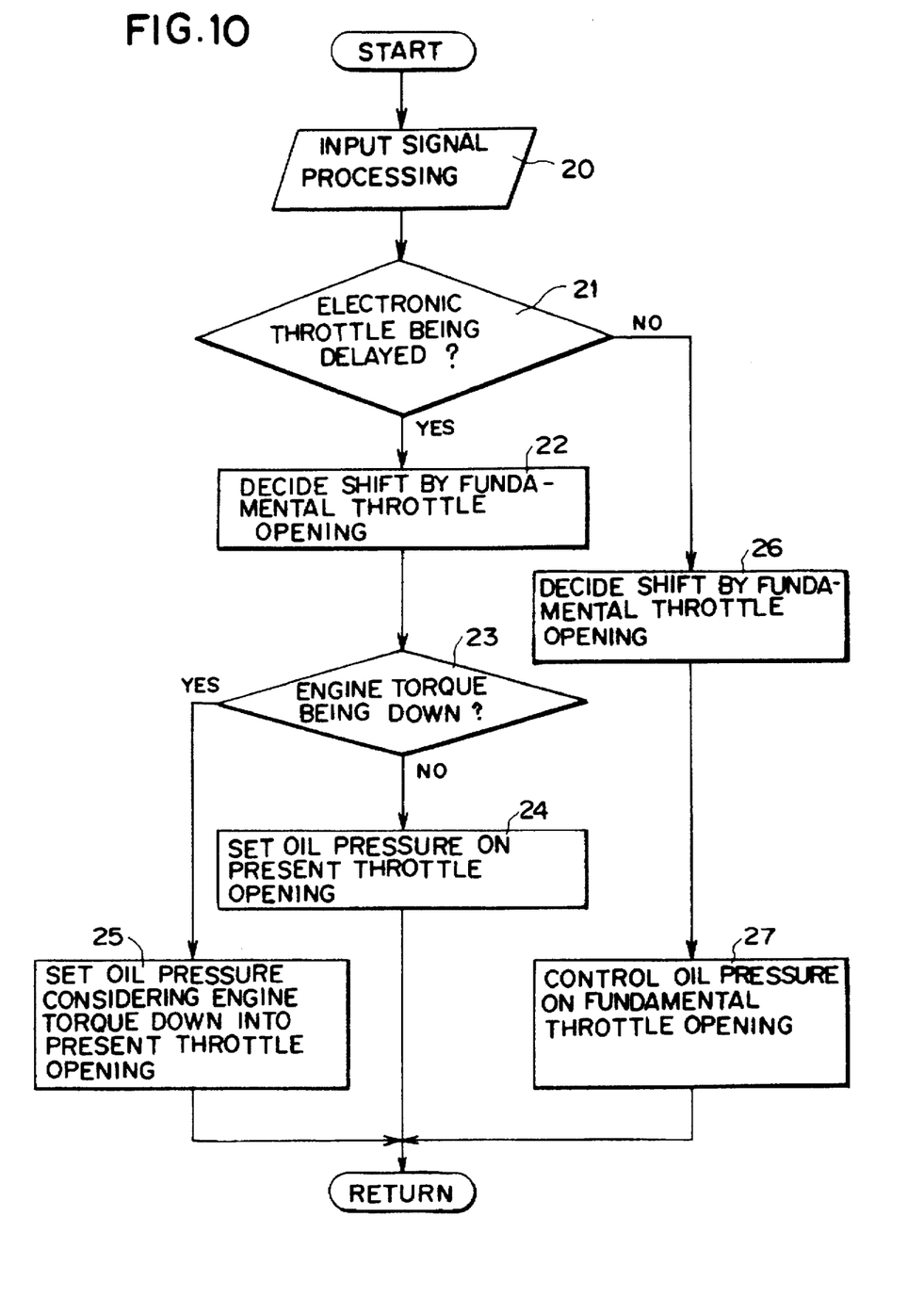
FIG. 10 is a flow chart showing one example of a control routine for selecting the shift decision and the control reference for the oil pressure control depending upon whether or not the delay control of the electronic throttle valve is executed.

As shown in FIG. 10, input signals are processed (at Step 20), and it is then decided (at Step 21) whether or not the delay control of the electronic throttle valve is executed. As described hereinbefore, the present throttle opening $\theta$ can be controlled rather freely by controlling electrically servo motor 16 for driving throttle valve, and its delay controlled may be executed from some request. For this, it is decided at first at Step 21 whether or not the delay control is being executed. If this answer is YES, the deviation of the present throttle opening $\theta$ from the accelerator opening VPA or the fundamental throttle opening TTA is so large that the shift decision is made (at Step 22) on the basis of the fundamental throttle opening TTA approximate to the throttle opening VPA or the operation variable of the driver. The operation of Step 22 corresponds to the "shift decision means" of the present invention.

It is then decided (at Step 23) whether or not the engine torque is being down during or before and after the shift. If this answer is NO because the engine torque down control is not executed, the control of the oil pressure in the automatic transmission 11 is determined (at Step 24) on the basis of the present throttle opening $\theta$ corresponding to the engine output. The operation of Step 24 corresponds to the "oil pressure adjusting means" of the present invention.

During the engine torque down control, on the other hand, the oil pressure is controlled to a relatively low level to elongate the shift time if the oil pressure of the automatic transmission 11 is determined on the basis of the present throttle opening $\theta$ determined with the delay control. In this case, the oil pressure is determined (at Step 25) considering the engine torque down control extent into the present throttle opening $\theta$. This determination can be made before the torque down control on the basis of a map having the present throttle opening to $\theta$ and the torque down extent as its parameters. Thus, the operation of Step 25 corresponds another "oil pressure adjusting means" of the present invention for correcting the engaging pressure of the frictional engagement means on the basis of the engine torque down control extent.

If the answer of Step 21 is NO because the delay control of the electronic throttle is not executed, the shift decision is made (at Step 26) on the basis of the fundamental throttle opening TTA, and the oil pressure control is made (at Step 27) on the basis of the fundamental throttle opening TTA. In other words, the shift decision and the oil pressure control adopt the fundamental throttle opening TTA because the response delay of the present throttle opening $\theta$ from the fundamental throttle opening TTA is a mechanically inevitable delay at most. Thus, the operation of Step 27 corresponds to another "oil pressure adjusting means" of the present invention.

The oil pressure thus determined is exemplified by the oil pressure PB2 of the second brake B2 at a clutch-to-clutch downshift from the 3rd speed to the 2nd speed. Specifically, this downshift is effected by regulating the engaging pressure of the third brake B3 at the applied side by the solenoid valve SLU to hold it at a low level, by controlling the oil pressure of the second brake B2 at the released side by the accumulator 121 to raise the engine R.P.M., by raising the engaging pressure of the third brake B3 gradually to raise the engine R.P.M. to the synchronous value for the 2nd speed without any overshoot, by releasing the second brake B2 completely and by applying the third brake B3 completely after the synchronization. The control procedure of this kind is disclosed in JP-A-6-341525. The changes in the oil pressures PB2 and PB3 of the brakes B2 and B3 are conceptionally presented in FIG. 11.

Figure 11:
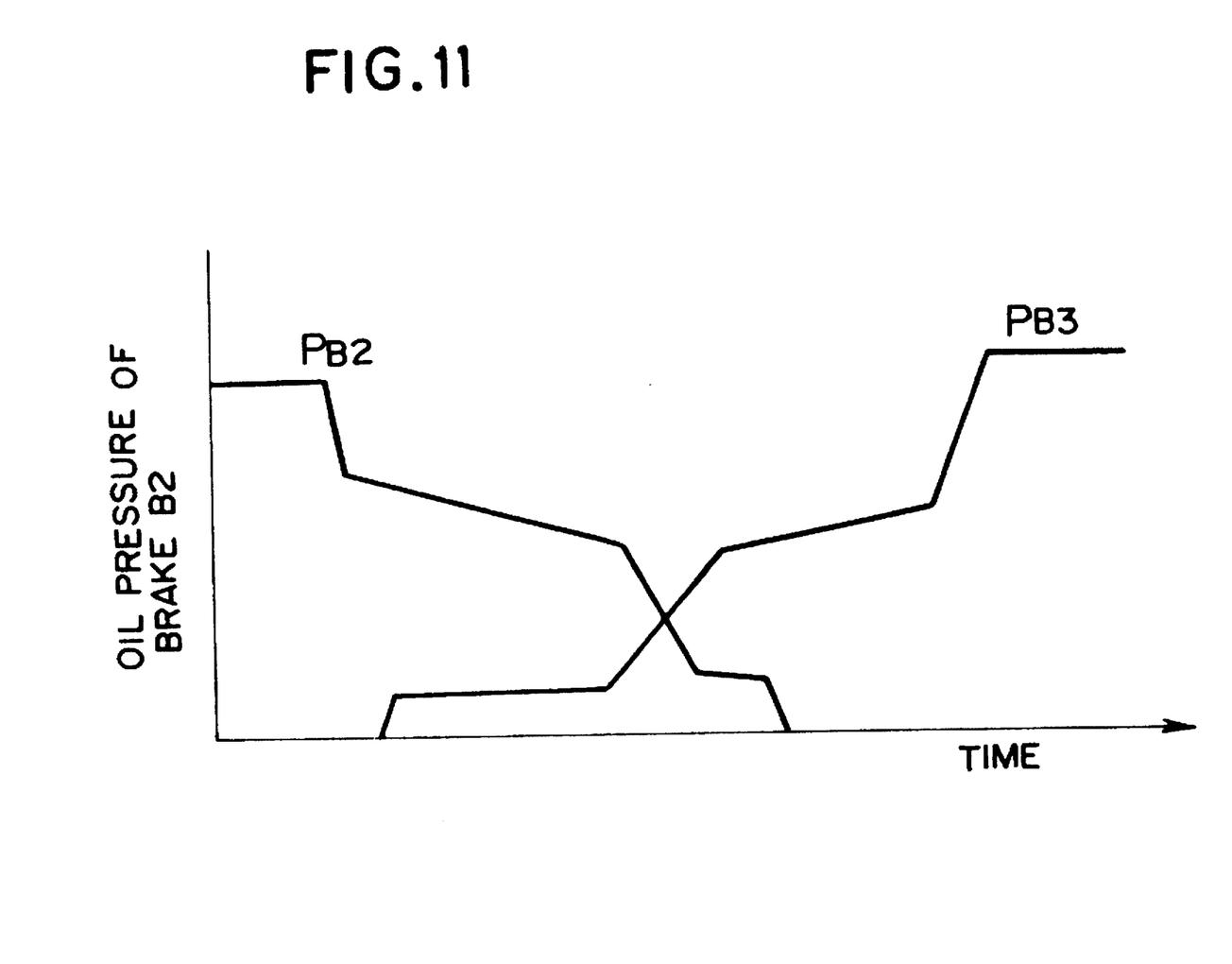
FIG. 11 is a diagram conceptionally illustrating the changes in the application pressure of the individual frictional engagement units at the time of a clutch-to-clutch shift from a 3rd speed to a 2nd speed.

Moreover, the engaging pressure PB2 of the second brake B2 is controlled by controlling the linear solenoid valve SLN in accordance with the engine torque to control the back pressure of the accumulator 121 with the output pressure of the linear solenoid valve SLN. The parameter indicating the engine torque of this case adopts the present throttle opening $\theta$ corresponding the most to the engine output when the delay control of the present throttle opening $\theta$ is executed in the aforementioned manner, so that the engaging pressure PB2 of the second brake B2 is controlled to a satisfactory extent. In other words, it is effectively prevented that the engaging pressure PB2 of the second brake B2 would be controlled to a high level, as the engine output is misjudged to be high, to cause the tie-up and the resultant shock although the increase in the engine output is suppressed.

Incidentally, the present invention should not be limited to the foregoing embodiment but could be practiced in the automatic transmission, which is equipped with a gear train or a hydraulic circuit different from that shown in FIG. 3 or 6, or a control system for the automatic transmission.

Here will be generally described the advantages to be achieved by the present invention. According to the control system of the present invention, the electric control means is interposed between the accelerating operation and the opening/closing operations of the throttle valve, so that the shift of the automatic transmission is decided on the basis of the fundamental throttle opening corresponding to the accelerator opening when the correlations between the two operations change according to the situations. In addition, the control of the oil pressure in the automatic transmission is made on the basis of the present throttle opening better corresponding to the output state of the engine. Thus, it is possible to effectively prevent the delay in the shift decision and the excess/shortage of the oil pressure. According to the present invention, a satisfactory shift control can be achieved with neither any slow feeling or erroneous shift due to a shift delay nor any shock due to an improper oil pressure.

What is claimed is:

1. A control system for an automatic transmission connected to an engine, in which a fundamental throttle opening is set with a predetermined delay characteristic from a depression stroke of an accelerator pedal and in which a present throttle opening is set with an inevitable delay and with a selective delay control for the fundamental throttle opening, comprising:

shift decision means for deciding a gear stage to be set in said automatic transmission, on the basis of said fundamental throttle opening; and oil pressure adjusting means for setting an oil pressure to be fed to a frictional engagement unit for achieving a gear stage, on the basis of said present throttle opening.

2. A control system for an automatic transmission according to claim 1, further comprising:

control condition decision means for deciding whether or not a predetermined condition is satisfied; and delay control means for setting said present throttle opening with a predetermined delay from said fundamental throttle opening if said control condition decision means decides the satisfaction of said condition, wherein said oil pressure adjusting means sets the oil pressure to be fed to said frictional engagement means, on the basis of said present throttle opening, only if said delay control means controls said present throttle opening with a predetermined delay from said fundamental throttle opening.

3. A control system for an automatic transmission according to claim 2, wherein said control condition decision means includes means for deciding the satisfaction of said condition if a shift range capable of setting all forward gear stages is selected in said automatic transmission.

4. A control system for an automatic transmission according to claim 2, wherein said control condition decision means includes means for deciding the satisfaction of said condition if either the temperature of said engine or the oil temperature of said automatic transmission is over a predetermined level.

5. A control system for an automatic transmission according to claim 2, wherein said control condition decision means includes means for deciding the satisfaction of said condition if the vehicle speed is over a predetermined level.

6. A control system for an automatic transmission according to claim 2, further comprising:

another oil pressure adjusting means for setting the oil pressure to be fed to said frictional engagement means, on the basis of said fundamental throttle opening unless the control by said delay control means is executed.

7. A control system for an automatic transmission according to claim 1, further comprising:

torque down control means for lowering the output torque of said engine temporarily while the shift control in said automatic transmission is being executed, wherein said oil pressure adjusting means sets the oil pressure to be fed to said frictional engagement means, on the basis of said present throttle opening unless said torque down control means executes a control to lower the output torque of said engine.

8. A control system for an automatic transmission according to claim 1, further comprising: torque down control means for lowering the output torque of said engine temporarily while the shift control in said automatic transmission is being executed; and another oil pressure adjusting means for setting the oil pressure to be fed to said frictional engagement means, if the engine torque is lowered during the shift, to the pressure which is prepared by correcting the pressure set on the basis of said present throttle opening in accordance with the lowering control amount of the engine torque.

9. A control system for an automatic transmission according to claim 2, further comprising:

torque down control means for lowering the output torque of said engine temporarily while the shift control in said automatic transmission is being executed, wherein said oil pressure adjusting means sets the oil pressure to be fed to said frictional engagement means, on the basis of said present throttle opening unless said torque down control means executes a control to lower the output torque of said engine.

10. A control system for an automatic transmission according to claim 9, wherein said control condition decision means includes means for deciding the satisfaction of said condition if a shift range capable of setting all forward gear stages is selected in said automatic transmission.

11. A control system for an automatic transmission according to claim 9, wherein said control condition decision means includes means for deciding the satisfaction of said condition if either the temperature of said engine or the oil temperature of said automatic transmission is over a predetermined level.

12. A control system for an automatic transmission according to claim 9, wherein said control condition decision means includes means for deciding the satisfaction of said condition if the vehicle speed is over a predetermined level.

13. A control system for an automatic transmission according to claim 9, further comprising:

another oil pressure adjusting means for setting the oil pressure to be fed to said frictional engagement means, on the basis of said fundamental throttle opening unless the control by said delay control means is executed.

14. A control system for an automatic transmission according to claim 2, further comprising:

torque down control means for lowering the output torque of said engine temporarily while the shift control in said automatic transmission is being executed; and another oil pressure adjusting means for setting the oil pressure to be fed to said frictional engagement means, if the engine torque is lowered during the shift, to the pressure which is prepared by correcting the pressure set on the basis of said present throttle opening in accordance with the lowering control amount of the engine torque.

15. A control system for an automatic transmission according to claim 14, wherein said control condition decision means includes means for deciding the satisfaction of said condition if a shift range capable of setting all forward gear stages is selected in said automatic transmission.

16. A control system for an automatic transmission according to claim 14, wherein said control condition decision means includes means for deciding the satisfaction of said condition if either the temperature of said engine or the oil temperature of said automatic transmission is over a predetermined level.

17. A control system for an automatic transmission according to claim 14, wherein said control condition decision means includes means for deciding the satisfaction of said condition if the vehicle speed is over a predetermined level.

18. A control system for an automatic transmission according to claim 14, further comprising:

another oil pressure adjusting means for setting the oil pressure to be fed to said frictional engagement means, on the basis of said fundamental throttle opening unless the control by said delay control means is executed.

19. A control system for an automatic transmission according to claim 1, wherein said oil pressure adjusting means includes means for adjusting the oil pressure of said frictional engagement means to be applied at the time of a clutch-to-clutch downshift.

20. A control system for an automatic transmission according to claim 2, wherein said oil pressure adjusting means includes means for adjusting the oil pressure said frictional engagement means to be applied at the time of a clutch-to-clutch downshift.

* * * * *